United States Patent [19]
Berman et al.

[11] Patent Number: 5,455,937
[45] Date of Patent: Oct. 3, 1995

[54] MICROCONTROLLER WITH FUSE-EMULATING LATCHES

[75] Inventors: Eric Berman; Greg Italiano, both of Hicksville, N.Y.; Ajay Padgaonkar, Sugarland, Tex.; Ray Allen, Mesa, Ariz.

[73] Assignee: Microchip Technology, Inc., Chandler, Ariz.

[21] Appl. No.: 268,673

[22] Filed: Jun. 30, 1994

Related U.S. Application Data

[63] Continuation of Ser. No. 790,969, Nov. 12, 1991, abandoned.

[51] Int. Cl.[6] ............................. G11C 7/00; G01R 31/28
[52] U.S. Cl. ........................................ 395/500; 395/180
[58] Field of Search .................................. 395/575, 500; 371/23, 16.2; 307/465; 364/232.3, 232.8, 933.8; 365/96

[56] References Cited

U.S. PATENT DOCUMENTS

| | | | |
|---|---|---|---|
| 4,527,234 | 7/1985 | Bellay | 364/200 |
| 4,691,316 | 9/1987 | Phillips | 371/20.1 |
| 4,857,774 | 8/1989 | El-Ayat et al. | 307/465 |
| 5,003,507 | 3/1991 | Johnson | 364/900 |
| 5,068,823 | 11/1991 | Robinson | 395/500 |
| 5,101,490 | 3/1992 | Getson, Jr. et al. | 395/425 |
| 5,138,706 | 8/1992 | Melo et al. | 395/500 |

Primary Examiner—Robert W. Beausoliel, Jr.
Assistant Examiner—Ly V. Hua
Attorney, Agent, or Firm—O'Connor Cavanagh

[57] ABSTRACT

A microcontroller fabricated on a semiconductor chip has an on-chip EPROM program memory with programmable EPROM configuration fuses located in a limited number of addresses of the on-chip program memory, the condition of each of EPROM fuse being defined as blown or not blown according to the value of the bit stored in the respective address of the on-chip program memory. The operating modes of the microcontroller are configurable by appropriately programming at least some of the EPROM fuses. Testing of the microcontroller in at least some of the operating modes is achieved by using latches outside the program memory to emulate the EPROM fuses, while suppressing the capability to set the condition of the EPROM fuses during the testing. Upon completion of the testing, control of the operating modes of the microcontroller is returned to the EPROM fuses, and the latches are precluded from further emulating the EPROM fuses.

10 Claims, 10 Drawing Sheets

FIG. 7

| OPCODE<15:12> \ OPCODE<11:8> | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | *** | MOVWF | SUBWFB | | SUBWF | | DECF | | IORWF | | ANDWF | | XORWF | | ADDWF | |
| 1 | ADDWFC | | COMF | | INCF | | DECFSZ | | RRCF | | RLCF | | SWAPF | | INCFSZ | |
| 2 | RRNCF | | RLNCF | | INFSNZ | | DCFSNZ | | CLRF | | SETF | | NEGW | | DAW | |
| 3 | CPFSLT | CPFSEQ | CPFSGT | TSTFSZ | ///// | ///// | ///// | ///// | BTG | BTG | BTG | BTG | BTG | BTG | BTG | BTG |
| 4 | MOVPF | MOVPF | MOVPF | MOVPF | MOVPF | MOVPF | MOVPF | MOVPF | MOVPF | MOVPF | MOVPF | MOVPF | MOVPF | MOVPF | MOVPF | MOVPF |
| 5 | MOVPF | MOVPF | MOVPF | MOVPF | MOVPF | MOVPF | MOVPF | MOVPF | MOVPF | MOVPF | MOVPF | MOVPF | MOVPF | MOVPF | MOVPF | MOVPF |
| 6 | MOVFP | MOVFP | MOVFP | MOVFP | MOVFP | MOVFP | MOVFP | MOVFP | MOVFP | MOVFP | MOVFP | MOVFP | MOVFP | MOVFP | MOVFP | MOVFP |
| 7 | MOVFP | MOVFP | MOVFP | MOVFP | MOVFP | MOVFP | MOVFP | MOVFP | MOVFP | MOVFP | MOVFP | MOVFP | MOVFP | MOVFP | MOVFP | MOVFP |
| 8 | BSF | BSF | BSF | BSF | BSF | BSF | BSF | BSF | BCF | BCF | BCF | BCF | BCF | BCF | BCF | BCF |
| 9 | BTFSS | BTFSS | BTFSS | BTFSS | BTFSS | BTFSS | BTFSS | BTFSS | BTFSC | BTFSC | BTFSC | BTFSC | BTFSC | BTFSC | BTFSC | BTFSC |
| A | TLRD | TLRD | TLRD | TLRD | TLWT | TLWT | TLWT | TLWT | TABLRD | TABLRD | TABLRD | TABLRD | TABLWT | TABLWT | TABLWT | TABLWT |
| B | MOVLW | ADDLW | SUBLW | IORLW | XORLW | ANDLW | RETLW | LCALL | MOVLB | ///// | | | | | | |
| C | GOTO | GOTO | GOTO | GOTO | GOTO | GOTO | GOTO | GOTO | GOTO | GOTO | GOTO | GOTO | GOTO | GOTO | GOTO | GOTO |
| D | GOTO | GOTO | GOTO | GOTO | GOTO | GOTO | GOTO | GOTO | GOTO | GOTO | GOTO | GOTO | GOTO | GOTO | GOTO | GOTO |
| E | CALL | CALL | CALL | CALL | CALL | CALL | CALL | CALL | CALL | CALL | CALL | CALL | CALL | CALL | CALL | CALL |
| F | CALL | CALL | CALL | CALL | CALL | CALL | CALL | CALL | CALL | CALL | CALL | CALL | CALL | CALL | CALL | CALL |

***:
0000: NOP
0001: UNUSED
0002: RETURN
0003: SLEEP
0004: CLRWDT
0005: RETFIE
0006: UNUSED

///// UNUSED (Execute as NOP)

FIG. 13

| 7 | 6 | 5 | 4 | 3 | 2 | 1 | 0 |
|---|---|---|---|---|---|---|---|
| TSTMUX | FPMMI | NGLWP | FPMMO | NWDTI | NWDTO | NOSCI | NOSCO |
| Code Protection | | Configuration | | | | | |

FIG. 14

| | CONFIGURATION | | | | PROGRAM MEMORY MAP SELECT & CODE PROTECTION | | | |
|---|---|---|---|---|---|---|---|---|
| | NOSCO | NOSCI | NWDTO | NWDTI | FPMMO | NGLWP | FPMMI | TSTMUX |
| Value written to emulate fuse erased | 0 | 1 | 1 | 1 | 1 | 0(1) | 0(1) | No fuse |
| Value written to emulate fuse programmed | $\bar{F}$(2) | — | 0 | 0 | 0 | — | — | No fuse |
| Value read in (5) test mode if TSTMUX=1 | TL | $\bar{F}$ | $\bar{F}$ | $\bar{F}$ | $\overline{TL}+\bar{F}$(3) | $\overline{TL}+\bar{F}$ | $\overline{TL}+\bar{F}$ | 1 |
| Value read in (5) test mode if TSTMUX=0 | $\bar{F}$ | TL | $\overline{TL}$ | $\overline{TL}$ | $\overline{TL}+\bar{F}$ | $\overline{TL}+\bar{F}$ | $\overline{TL}+\bar{F}$ | 0 |
| Value read in (5) normal mode | $\bar{F}$ | $\bar{F}$ | $\bar{F}$ | $\bar{F}$ | $\bar{F}$ | $\bar{F}$ | $\bar{F}$ | 0 |
| Value latch reset to in normal mode | 0 | 0 | $\bar{O}$(4) | $\bar{O}$(4) | $\bar{O}$(4) | 0 | 0 | 0 |

NOTES:
1. Writing this value will not override the fuse if the fuse is already blown.
2. $\bar{F}$ = The Inverted value of the fuse. F=1: erased, F=0: programmed.
3. TL = The value the test latch was written or reset to. $\overline{TL}$ = inverted test latch value.
4. These bits read back inverted. Write 1; read 0. Bit reset to 0 would read as 1.
5. Also indicates whether the fuse (F or $\bar{F}$) or test latch (TL or $\overline{TL}$) is controlling the chip.

MICROCONTROLLER WITH FUSE-EMULATING LATCHES

This application is a continuation of application Ser. No. 07/790,969 filed on Nov. 12, 1991, which is now abandoned.

BACKGROUND OF THE INVENTION

The present invention relates generally to semiconductor microcontrollers, and more particularly to a microcontroller having operating states configured by EPROM fuses and in which the EPROM configuration fuses are emulated by latches for purposes of testing.

Microprocessors have evolved into complex instruments and machines which require sophisticated, fast real-time control capability. Instead of using large microprocessors of 16 or 32 bit capability along with interrupt handler chips, programmable timer chips, ROM and RAM chips, the field has gone to a single chip microcontroller in which all peripherals are embedded on the same chip. Operation of the chip in an expanded mode allows gaining the versatility of all on-chip features. Microcontrollers are used in a wide diversity of present-day applications, with new applications found almost daily. In hand-held instruments such as tiny pocket-sized pagers, the microcontroller is responsive to received characters to interpret them, produce a beep to notify the user of an incoming message (or not if the user prefers an inaudible mode), and poduces multiple mesages among the several last of those received on a suitable display, typically an LCD. The microcontroller can also recall from its internal memory any or all of the messages received in a given period of time. The chip is also used in other instrumentation such as meters and testers, capable of carrying out thousands of tests, each in a millisecond or less.

Other applications include keyboard controllers for personal computers, in which the microcontroller serves to offload many tasks formerly handled by the processor. The chip continuously performs a series of diagnostic procedures, and notifies the processor if it detects a problem. Among other personal computer applications, microcontrollers are used in modems for command interpretation and data transmission, in printer buffers for high speed dumping of data in preparation for driving the printer at the considerably lower speed at which the printer operates or for color plotters, in color copiers, electronic typewriters, cable television terminal equipment, lawn sprinkling controllers, credit card phone equipment, automotive applications such as engine control modules, antilock braking systems, automobile suspension control for desired desination of ride softness or rigidity depending on user preference, and a host of other applications used daily by industrial and consumer customers.

A real time microcontroller is a microcomputer adapted to provide rapid solutions to signal processing algorithms and other numerically intensive computations, and, as well, to control real time events such as opening and closing of relays, controlling the position and speed of a motor, and others such as mentioned above. The central processing unit (CPU) of the microcontroller operates in conjunction with certain peripherals for purposes of such control. The peripherals may include devices such as timers, signal ports, and baud rate generators, among others.

It would be desirable in a microcontroller or related devices to have the capability to configure and, if necessary, reconfigure the device for selection of various available options, features, and/or components to enable each of them to be tested by the user. In a line of prior art microcontroller devices marketed as the PIC™16C5X family by Microchip Technology Inc., assignee of the instant application, the devices were provided with configurability of an on-chip oscillator, an on-chip watchdog timer, and certain code protection modes. The configurability and selection of configuration was selected using EPROM fuses, which are essentially usable only one time because, once written, the fuse is not readily altered to test a new configuration. In addition, writing of EPROM fuses for test purposes is time consuming and increases test time and cost.

SUMMARY OF THE INVENTION

According to the present invention, EPROM configuration fuses of a microcontroller or microprocessor are emulated by latches for the purpose of configuring and reconfiguring the device for initial test purposes without the limitations, cost, programming time or test time encountered with EPROM fuses. In essence, a set of latches is incorporated in the device to act as a shadow of the EPROM configuration fuses. The latches can be written and rewritten to emulate various configurations, that are otherwise selectable by EPROM fuses, to permit manufacturer and/or user testing of the various configurations. When testing is complete, the EPROM configuration fuses may be used to configure the product for its particular application, and the test latches are no longer used to select or control the configuration.

Accordingly, it is a principal object of the present invention to provide a new and improved system and method for temporarily configuring and reconfiguring selectable options, modes, features and functions of a microcontroller or microprocessor chip, to enable the selected option or the like to be tested prior to final selection of a desired configuration.

A more specific object of the invention is to provide latches in such a device for shadowing or emulating EPROM configuration fuses which would otherwise be used for configuring the various operating options for purposes of conducting tests, and, when the tests are complete and the desired option or the like has been finally selected for device operation, performing that selection by programming (or not programming) the appropriate EPROM fuses and removing all configuration control from the latches.

BRIEF DESCRIPTION OF THE DRAWINGS

The above and still further objects, features, aspect and attendant advantages of the invention will become apparent from a consideration of the following detailed description of the best mode of carrying out the invention as presently contemplated, taken in conjunction with the accompanying drawings in which:

FIG. 7 is an exemplary instruction decode map of the instruction set of the microcontroller of FIG. 1, in mnemonic code;

FIG. 13 is a table illustrating a test mode register for the microcontroller; and FIG. 14 is a table illustrating an organization of test latch emulating the configuration fuses of the microcontroller to allow configuration of the device without blowing the fuses.

DETAILED DESCRIPTION

Figure 1:
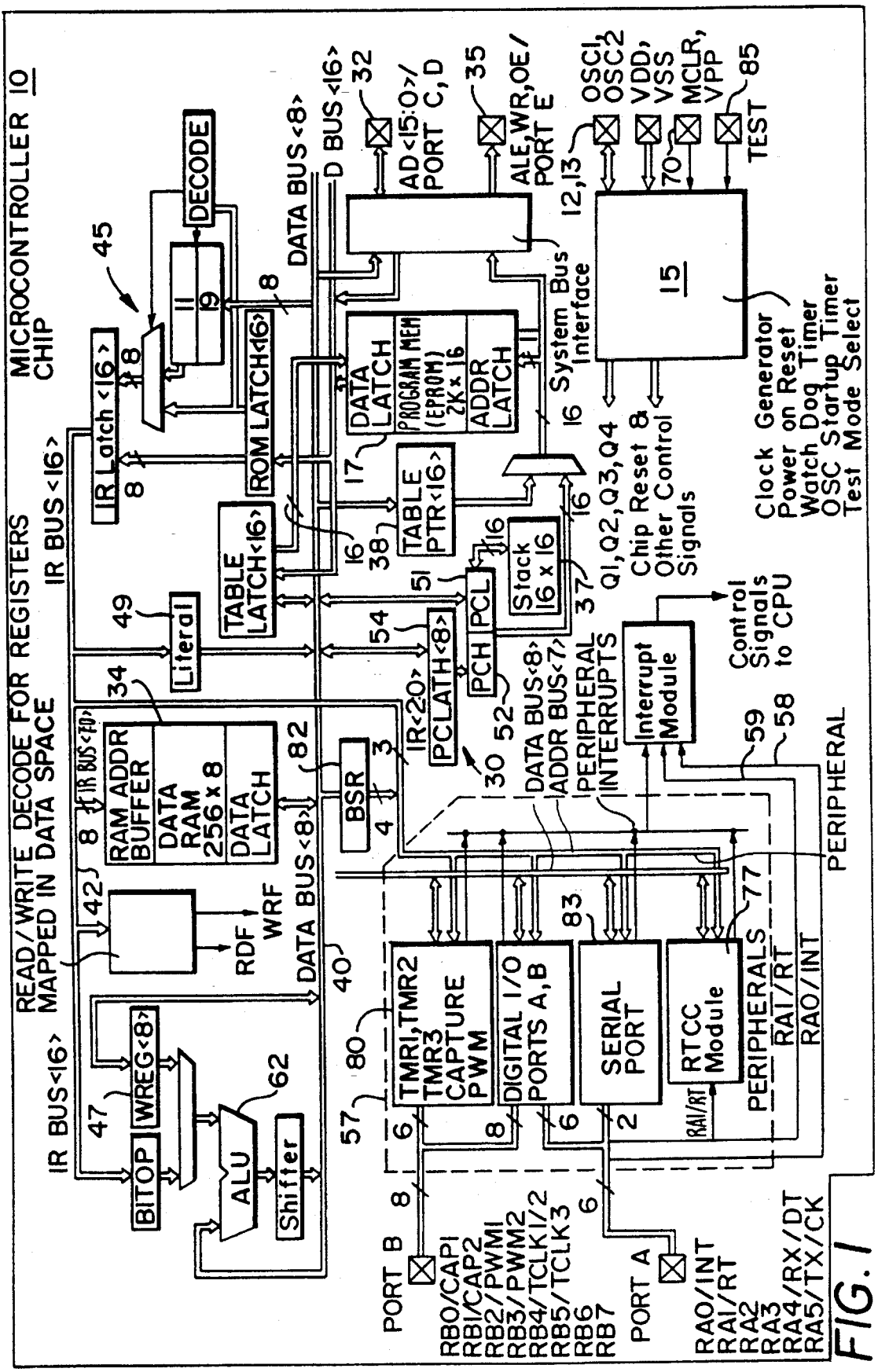
FIG. 1 is a block diagram of the overall microcontroller chip incorporating a preferred embodiment of the present invention.

The invention will be described in the context of a high performance EPROM-based 8-bit microcontroller, but this is for purposes of example only and not a limitation on the invention. In one suitable embodiment, the microcontroller is fabricated in a CMOS semiconductor integrated circuit chip which incorporates a central processing unit (CPU) having a 250 nanosecond (ns) instruction cycle, with an array of peripheral resources for performing complex real-time control applications. Some of the control applications for which such a device is suitable are described in the above background section of this specification. The EPROM-based device permits the user to develop and test code on a windowed ceramic dual in-line package (ceramic DIP or, CERDIP) version, and having done so, to move into production with a more cost effective, one-time programmable (OTP) plastic DIP package version.

The features of the CPU in this exemplary embodiment preferably include fully static design; 8 bit wide data path; 16 bit wide instructions (all, single word); single cycle instructions in most instances, and two cycle in the others; 250 ns cycle time at 16 megahertz (MHz) or higher frequencies (e.g., 20 or 25 MHz); one megabit addressable program memory space (in 64K×16 format); direct, indirect (with auto increment and decrement), immediate and relative addressing; and four modes of operation including microcontroller mode, secure (code protected) microcontroller mode, extended microcontroller mode (both internal and external program memory access), and microprocessor mode (external only program memory access).

Preferably, a high level of device integration exists, including 32K on-chip (i.e., embedded in the chip itself together with the microcontroller) EPROM program memory, 2K of general purpose (SRAM) registers, special function registers, hardware stack, external/internal interrupts, I/O, timer/counters, capture registers, high speed PWM outputs (10 bit, 15.6 KHz), and serial port (universal synchronous/asynchronous receiver-transmitter, or USART) with baud rate generator.

Some of the features of the microcontroller embodiment to be described herein to which at least some of the inventive aspects apply include a watchdog timer with its own on-chip RC (resistance-capacitance) oscillator for reliable operation; a power saving sleep mode; an on-chip power-up timer and power on reset feature to reduce external circuitry; an on-chip oscillator start-up timer; fuse selector oscillator options including standard crystal oscillator, low frequency crystal oscillator, and RC oscillator or external clocking; and fusible code protection.

The exemplary microcontroller in which the present invention is employed is high performance, attributable in part to certain architectural features found in conventional reduced instruction set calculation (RISC) microprocessors. A modified Harvard architecture is used in which programs and data are accessed from separate memories (referred to as program memory and data memory, respectively). Bandwidth is improved over traditional Von-Neuman architecture in which program and data are fetched from the same memory. Separating the program and data memory also allows instructions to be sized on other than 8-bit wide data words. 16-bit wide op-codes are used in the microcontroller so that single word instructions throughout are possible. A full 16-bit wide program memory access bus fetches a 16 bit instruction in a single cycle, and a two-stage pipeline overlaps fetch and execution of instructions. Consequently, all instructions to be described below execute in a single cycle (250 ns @ 16 MHz) except for program branches and special instructions to transfer data between program and data memories.

The microcontroller addresses 64K×16 program memory space and integrates 2K×16 EPROM program memory on chip. Program execution can be performed in a microcontroller mode which is internal only, or in a microprocessor mode which is external only, or in an extended microcontroller mode which is both internal and external. Data memory locations (file registers), e.g., 256 such locations, are addressed directly or indirectly by the microcontroller. Special function registers including the program counter are mapped in the data memory. Use of a substantially orthogonal (symmetrical) instruction set allows any operation to be carried out on any register using any addressing mode.

Figure 2:
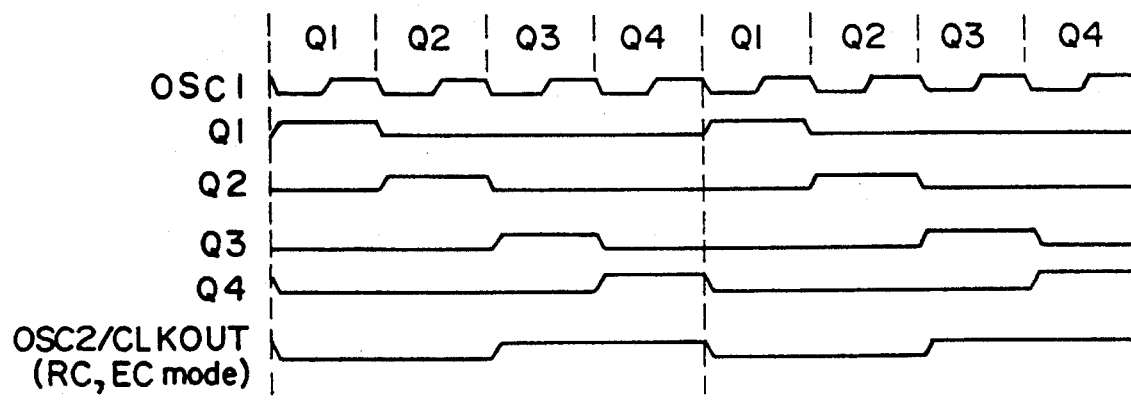
FIG. 2 is a timing diagram illustrating the internal clocking scheme of the microcontroller chip of FIG. 1.

The microcontroller will be described with reference to the block diagram of a microcontroller chip 10 of FIG. 1, among other Figures, but it will be helpful to the reader to first consider the internal clocking scheme of the microcontroller is shown in FIG. 2. Microcontroller 10 can accept an external clock (EC) input, among other oscillator options, on an OSC1 pin 12 of a circuit block or module 15 which incorporates timing and related (reset and control) circuitry to be described in greater detail presently. Internally, the clock input to the OSC1 pin is divided by four to generate four phases (Q1, Q2, Q3 and Q4) each with a frequency equal to clock input/4 and a duty cycle of 25%. If the EC input mode or an RC oscillator mode (RC mode, described below) is selected, the OSC2 pin 13 of the microcontroller chip provides a clock output (CLKOUT), which is high during Q3, Q4 and low during Q1, Q2, as shown at the bottom of the timing diagram of FIG. 2. While internal chip reset is active, the clock generator holds the chip 10 (also sometimes referred to herein as the device or the microcontroller) in the Q1 state, with the CLKOUT driven low.

The function of the OSC1 pin 12 is as the external clock input in the EC mode, and the oscillator input in the RC mode or crystal/resonator mode (XT mode, described below). The OSC2 pin 13 functions as the oscillator output. It connects to a crystal or resonator in the XT mode, and, in the EC mode or RC mode, it outputs CLKOUT at one-fourth the frequency at OSC1, and denotes the instruction cycle rate.

The oscillator options allow the device to be adapted to the particular application in which it is to be used. For example, the RC oscillator option reduces system cost, whereas an LF (low frequency) crystal/resonator option saves power. The oscillator options or modes will be described with reference to FIG. 3, which includes three circuit diagrams labeled (a), (b) and (c) for the EC, RC and XT (or low frequency crystal oscillator, LF) modes, respectively. Any one of these four possible modes may be selected by appropriately defining the states of a pair of EPROM configuration fuses FOSC1 and FOSC0 which are mapped in predetermined address locations in program memory 17 (FIG. 1), and about which additional details will be given later herein. In part (a) of FIG. 3, the OSC1 input is driven by CMOS drivers for an external clock, so that pin 12 is a high impedance CMOS input. Circuit 15a performs a divide-by-4 function, and OSC2 pin 13 outputs CLKOUT. The preferred frequency range for this mode is DC to 16 Mhz.

The RC mode depicted in part (b) requires an external resistance 18 and capacitance 19 in series combination connected to power source $V_{DD}$, with the point of connection between the RC components connected to OSC1 pin 12, and the CLKOUT output at OSC2 pin 13. The internal components of circuit 15b for this mode are as shown, the input SLEEP to gate 23 being an instruction within the instruction set of the microcontroller, to be described. While the RC mode is cost effective, it is subject to variation of frequency of oscillation with power supply, temperature and from chip to chip because of process variation. Accordingly, it is not an appropriate choice for timing sensitive applications which require accurate oscillator frequency. Frequency range for this mode is nominally DC to 4 Mhz.

Figure 3:
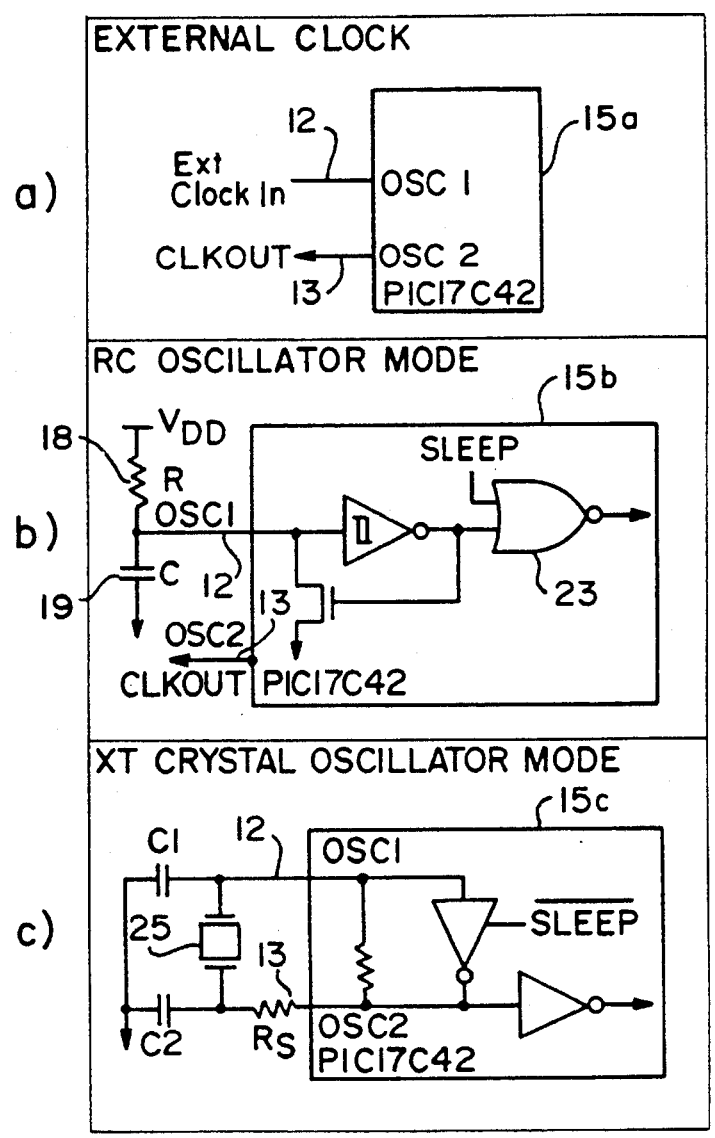
FIG. 3 includes parts (a), (b) and (c) which are simplified block diagrams of four (part (c) essentially defining two) different selectable oscillator modes for the microcontroller chip of FIG. 1.

In the XT mode of part (c) of FIG. 3, a crystal or ceramic resonator 25 of fundamental mode is connected across the OSC1 and OSC2 pins 12 and 13, and the basic internal makeup of circuit 15c is as shown. If an overtone mode crystal were used (e.g., above 20 Mhz), a tank circuit consisting of a series LC circuit across capacitance C2 would be employed to attenuate the gain at the fundamental frequency. The frequency range of XT is 0.2–16 Mhz. The LF mode is essentially the same as the XT mode, except that it is used for crystals of frequency range 32 Khz to 200 Khz.

Figure 4:
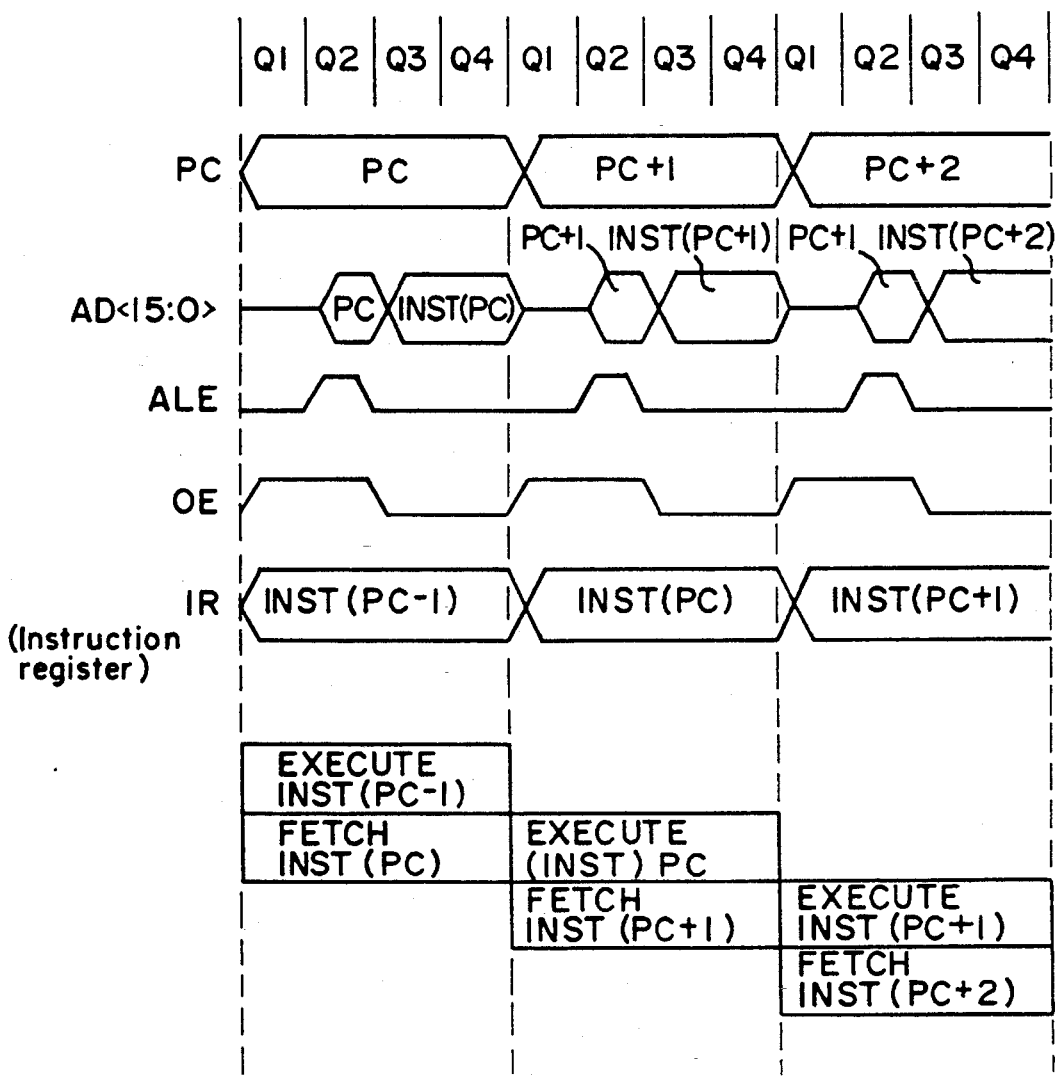
FIG. 4 is a timing diagram of the instruction fetch/execute pipeline in the instruction cycle of the microcontroller chip of FIG. 1.

Referring to FIG. 4, which illustrates the instruction fetch/execute pipeline, an instruction cycle in the microcontroller consists of phases Q1, Q2, Q3 and Q4 of the internal clock. Instruction fetch and execute are pipelined so that fetch occupies one instruction cycle and decode together with execute occupy another instruction cycle (see lower portion of FIG. 4). The pipelining, however, effectively results in the execution of each instruction in a single cycle, as shown in that portion of FIG. 4, with a few exceptions (e.g., where an instruction causes program counter PC to change, or instructions TABLRD and TABLWT are used) to be discussed presently. A fetch cycle starts with the PC (generally shown at 30 of FIG. 1) incrementing in phase Q1. The address is presented on pins AD15–AD0 (labeled AD<15:0>, see 32 of FIG. 1) during Q2 for internal execution, and the instruction is latched on the falling edge of Q4. The fetched instruction is latched into an instruction register (IR) which is decoded and executed during phases Q2, Q3 and Q4. Data memory (random access memory, or RAM) 34 (FIG. 1) is read during Q2 (operand read) and written during Q4 (destination write).

The portions of FIG. 4 designated ALE and $\overline{OE}$ (at 35 of FIG. 1) are at port pins configurable as input or output in software, with TTL compatible input (bits 0 and 1 of port E, respectively). In microprocessor mode or extended microcontroller mode of operation (discussed below) of chip 10, the ALE pin is the address latch enable output, and the address is latched on the falling edge of the ALE output; and the $\overline{OE}$ pin is the output enable control output (active low, as indicated by the bar above the designation).

In addition to separate program and data memory space 17 and 34 (FIG. 1) in the Harvard architecture employed by the microcontroller, a hardware stack 37 is provided which is separate from both. The data space in the exemplary embodiment is 256 bytes in size, and is principally implemented as static RAM. The remaining portion of the data space consists of special function registers implemented as individual hardware registers.

In the exemplary embodiment, no data memory address bus or data bus is brought outside the chip, and hence, data memory cannot be expanded externally. If desired, however, data segments can be created in external program memory. The 16 bit wide on-chip program memory 17 is addressed by the 16 bit program counter 30 for instruction fetch, and by a 16 bit wide table pointer register (TBLPTR) 38 for data move to and from data space. In the exemplary embodiment, addressable program memory is 64K×16, and the on-chip program memory is an EPROM array arranged 2K×16.

The microcontroller 10 may operate in any one of four different modes having different program memory organization or configurations, which have been referred to earlier herein. These are:

(1) A microcontroller mode, in which only internal execution is allowed and, hence, only the on-chip program memory 17 is available. Any attempted access to program memory beyond 2K automatically generates a "no operation" (NOP) instruction. A set of EPROM fuses (configuration bits) is used to select various options including these operating modes of the device, the provision of code-security and write protection. The fuses, as well as test memory used at the factory for testing the device, and boot memory used to store programs used for programming and verification, are accessible in this mode.

(2) A protected microcontroller mode, which is the same as the microcontroller mode except that code protection is enabled, as will be described presently.

(3) An extended microcontroller mode, in which on-chip program memory 17 (0–2K) and external memory (2K–64K) are available, but fuses, test memory and boot memory are not accessible. Execution automatically switches to external memory if the program memory address exceeds the highest address available in the latter memory.

(4) A microprocessor mode, in which on-chip program memory 17 is not used, and the entire 64K of external memory for programming is mapped externally. Fuses, test memory and boot memory are not accessible in this mode.

Figure 5:
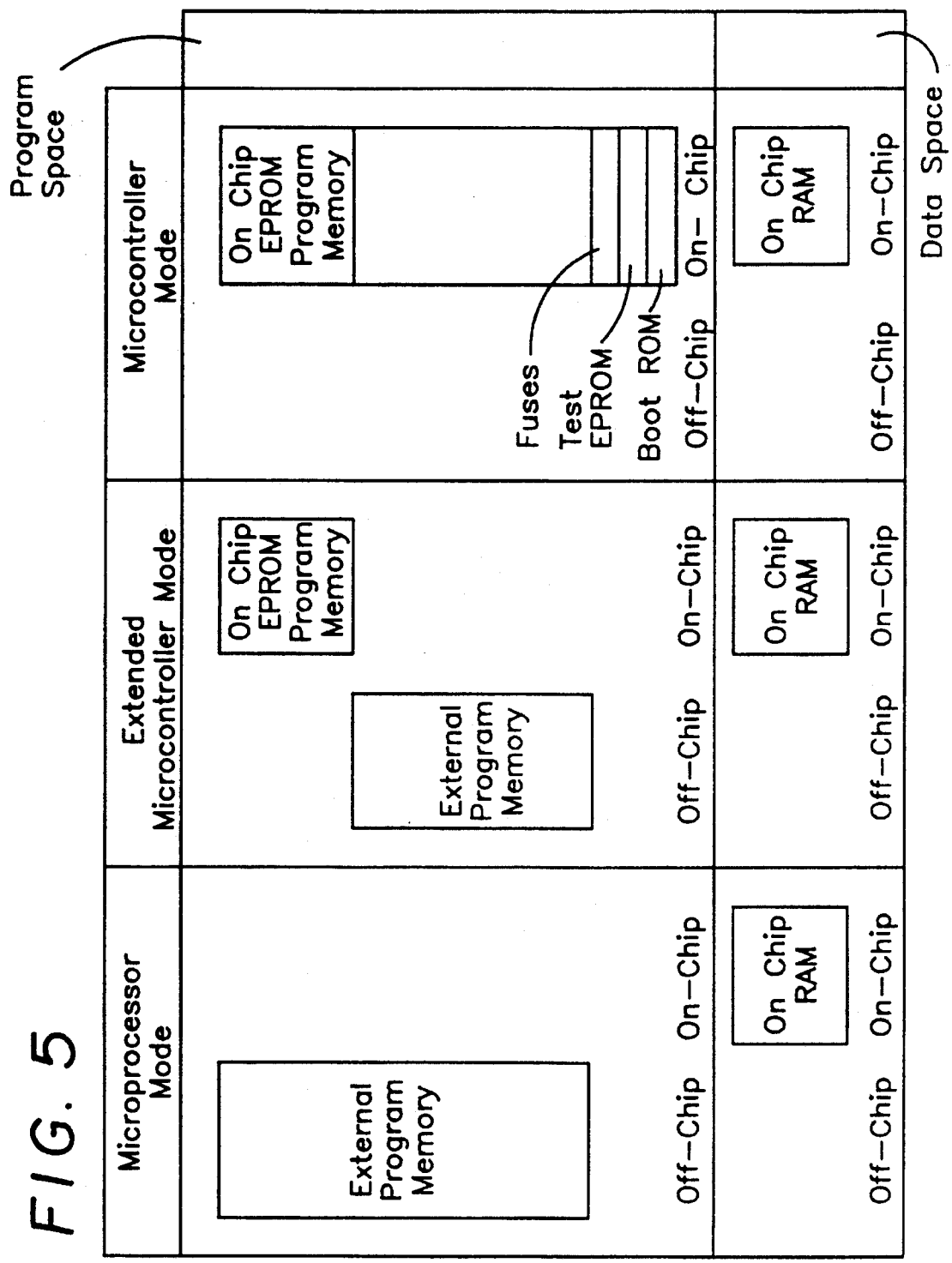
FIG. 5 is a memory map of the different operating modes of the microcontroller chip of FIG. 1 which may be selected by choosing different configurations of program memory.

A memory map of the different modes is shown in FIG. 5. The protected microcontroller mode is not shown because it is the same as the microcontroller mode except as indicated above.

Figure 6:
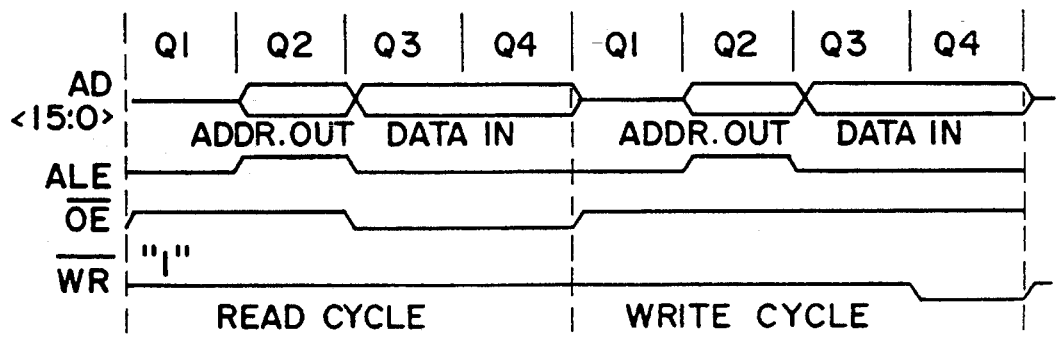
FIG. 6 is a timing diagram for external program memory read and write.

An external program memory interface used if external execution is selected has ports C, D and E (see 32 and 35 of FIG. 1) configured as a system bus for the external program memory access. Ports C and D together constitute a 16 bit wide multiplexed address and data bus. Three bit E port outputs control signals ALE (Address Latch Enable), $\overline{OE}$ (Output Enable) and $\overline{WR}$ (Write Enable). External program memory read and write timings are shown in FIG. 6. An external memory access cycle includes four oscillator cycles (between rising edges of successive Q1's). During Q2, a 16 bit address is presented on ports C and D, and ALE is asserted. The address output is latched by the falling edge of ALE. In an instruction fetch or data read cycle, OE is asserted during Q3 and Q4. The data is latched on the rising edge of OE. One oscillator cycle separation between OE and address output guarantees adequate time for external memories to shut off their output drivers before the address is driven onto the bus. In a data write cycle (only during TABLWT instruction), following address output during Q2, data is driven onto the bus during Q3 and Q4. WR is asserted during Q4 and the data output is valid both on its falling and rising edge.

The data memory 34 (FIG. 1) on the microcontroller chip is organized as 256×8, and is accessed via an internal 8 bit data bus 40 and an 8 bit data-memory-address bus 42 derived from the instruction register 45. Addressing is done via direct addressing mode or through indirect addressing mode using file select registers as pointer registers. All but a few (e.g. TBLATH (table latch high byte), TBLATL (table latch low byte)) special function registers (such as W (accumulator), RTCC, program counter and ports) are mapped in the data memory, and the remainder of the data memory is implemented as static RAM. The watchdog timer and the stack pointer, as well as TBLATH and TBLATL, are not addressable.

In the instruction set for the microcontroller, each instruction is a single word, 16 bits wide, and virtually all instructions are executed in a single instruction cycle. The instruction set consists of 55 instructions, is highly orthogonal and is grouped into data move operations, arithmetic and logical operations, bit manipulation operations, program control operations and special control operations. The orthogonal instruction set allows read and write of special function registers, such as PC and status registers. The instructions, in mnemonic code, and their descriptions are as follows (refer, also, to the instruction decode map of FIG. 7).

ADDLW (Add literal to W): Contents of the W register 47 are added to the 8 bit literal field (constant data) "k" 49 and the result is placed in the W register.

ADDWF (Add W to of): Add contents of W register 47 to data memory location "f" (register file address). If "d" (destination select) is 0, result is stored in W register. If "d" is 1, result is stored in data memory location "f".

ADDWFC (Add W and Carry to f): Add the W register and the Carry Flag to data memory location "f". If "d" is 0, the result is placed in the W register. If "d" is 1, the result is placed in data memory location "f".

ANDLW (AND literal and W): The contents of W register and AND'ed with the eight bit literal "k". The result is placed in the W register.

ANDWF (AND W with f): AND the W register with data memory location "f". If "d" is 0, the result is stored in the W register. If "d" is 1, the result is stored in data memory location "f".

BCF (Bit Clear f): Bit "b" (bit address within 8-bit file register) in data memory location "f" is reset to 0.

BSF (Bit Set f): Bit "b" in data memory location "f" is set to 1.

BTFSC (Bit test, skip if clear): This can be one of the few two-cycle instructions. If bit "b" in data memory location "f" is "0", then the next instruction is skipped. If bit "b" is "0", the next instruction, fetched during the current instruction execution, is discarded and NOP (no operation) is executed instead making this a 2-cycle instruction.

BTFSS (Bit test, skip if set): If bit "b" in data memory location "f" is "1", then the next instruction, fetched during the current instruction execution, is discarded and a NOP is executed instead making this a 2-cycle instruction.

BTG (Bit Toggle f): Bit "b" in data memory location "f" is inverted.

CALL (Subroutine Call): This is a 2-cycle instruction. Subroutine call within 8K page. First, return address (PC+1) is pushed into the stack. The thirteen bit value is loaded into PC bits <12:0>. Then the upper eight bits of the PC is copied into PCLATH (program counter high holding latch).

CLRF (Clear f and Clear d): The contents of data memory location "f" are set to 0. If "d" is "0", the contents of both data memory location "f" and W register are set to "0". If "d" is "1", only contents of data memory location "f" are set to "0".

CLRWDT (Clear Watchdog Timer): The watchdog timer (WDT) and the prescaler of the WDT are reset. CPU status bits TO (tome-out) and PD (power-down) are set.

COMF (Complement f): The contents of data memory location "f" are complemented. If "d" is "0", the result is stored in W. If "d" is "1", the result is stored in data memory location "f".

CPFSEQ (Compare f with W, skip if f=W): If the contents of data memory location "f" are equal to the contents of the W register, the next instruction, fetched during the current instruction execution, is skipped (discarded) and a NOP is executed instead, making this a 2-cycle instruction.

CPFSGT (Computer f with @, skip if f>W): If the contents of data memory location "f" are greater than the contents of the W register, the next instruction, fetched during the current instruction execution, is skipped (discarded) and a NOP is executed instead, making this a 2-cycle instruction.

CPFSLT (Compare f with W, skip if f<W): If the contents of data memory location "f" are less than the contents of the W register, the next instruction, fetched during the current instruction execution, is skipped (discarded) and a NOP is executed instead, making this a 2-cycle instruction.

DAW (Decimal Adjust W Register): The eight bit value in the W register resulting from the earlier addition of two variables (each in packed BCD (binary coded decimal) format) is adjusted, and a correct packed BCD result is produced. If "d" is "0", the result is placed in the W register and data memory location "f". If "d" is "1", the result is placed only in data memory location "f".

DECF (Decrement f): Decrement data memory location "f". If "d" is "0", the result is stored in the W register. If "d" is "1", the result is stored in data memory location "f".

DECFSZ (Decrement f, skip if 0): The contents of data memory location "f" are decremented. If "d" is "0", the result is placed in the W register. If "d" is "1", the result is placed in data memory location "f". If the result is "0", the next instruction, which is already fetched, is skipped by discarding, and a NOP is executed instead, making it a 2-cycle instruction.

DCFSNZ (Decrement f, skip if not 0): The contents of data memory location "f" are decremented. If "d" is "0", the result is placed in the W register. If "d" is "1", the result is placed in data memory location "f". If the result is not "0", the next instruction, fetched during the current instruction execution, is discarded. A NOP is executed instead making this a 2-cycle instruction.

GOTO (Unconditional Branch): This is a 2-cycle instruction. Allows an unconditional branch anywhere within an 8K page boundary. The thirteen bit immediate value is loaded into PC bits. Then the upper eight bits of PC are loaded into PCLATH.

INCF (Increment f): The contents of data memory location "f" are incremented. If "d" is "0", the result is placed in the W register. If "d" is "1", the result is placed in data memory location "f".

INCFSZ (Increment f, skip if 0): The contents of data memory location "f" are incremented. If "d" is "0", the result is placed in the W register. If "d" is "1", the result is placed in data memory location "f". If the result is "0", the next instruction, fetched during the current instruction execution, is skipped "discarded" and a NOP is executed instead, making this a 2-cycle instruction.

INFSNZ (Increment f, skip if not 0): The contents of data memory location "f" are incremented. If "d" is "0", the result is placed in the W register. If "d" is "1", the result is placed in data memory location "f". If the result is not "0" the next instruction, fetched during the current instruction execution, is discarded and a NOP is executed instead, making this a 2-cycle instruction.

IORLW (Inclusive OR literal with W): The contents of the W register are inclusively OR'ed with the eight bit literal "k". The result is placed in the W register.

IORWF (Inclusive OR W with f): Inclusive OR the W register with data memory location "f". If "d" is "0", the result is stored in the W register. If "d" is "1", the result is stored in data memory location "f".

LCALL (Long Call): Allows unconditional subroutine call to anywhere within the 64k external program memory space. The return address (PC+1) is first pushed onto the stack, and then a 16 bit destination address is loaded into the PC. The lower 8 bits of the destination address are embedded into the instruction. The upper 8 bits of the PC are loaded from PCLATH.

MOVFP (Move f to p): Move data from data memory location "f" to data memory location "p" (peripheral register file address). Location "f" can be anywhere in the 256 word data space, while the location of "p" is limited. Either "p" or "f" can be the W register, and both "f" and "p" can be indirectly addressed.

MOVLB (Move Literal to BSR): The constant is loaded in the BSR (bank select register). Only the low 4 bits of the BSR are physically implemented.

MOVLW (Move Literal to W): The eight bit literal "k" is loaded into W register.

MOVPF (Move p to f): Move data from data memory location "p" to data memory location "f". Location "f" can be anywhere in the 256 byte data memory space, while the location of "p" is limited. Either "p" or "f" can be the W register.

MOVWF (Move W to f): Move data from W register to data memory location "f". Location "f" can be anywhere in the 256 word data memory space.

NEGW (Negate W): The contents of the W register are negated using 2's complement. If "d" is "0", the result is placed in W register and data memory location "f". If "d" is "1", the result is placed only in data memory location "f".

NOP (No Operation): No operation.

RETFIE (Return from Interrupt): This is a 2-cycle instruction, which returns from interrupt. The stack is popped and TOS (top of the stack) is located in PC. Interrupts are enabled by clearing a GLINTD (global interrupt disable) bit.

RETLW (Return Literal to W): This is a 2-cycle instruction. The W register is loaded with the eight bit literal "k". The PC is loaded from the TOS (the return address). The high address latch (PCLATH) remains unchanged.

RETURN (Return from Subroutine): This is a 2-cycle instruction, which returns from subroutine. The stack is popped and the TOS is loaded into the PC.

RLCF (Rotate Left f through Carry): The contents of data memory location "f" are rotated one bit to the left through the Carry Flag. If "d" is "0", the result is placed in the W register. If "d" is "1", the result is stored back in data memory location "f".

RLNCF (Rotate Left f (no carry)): The contents of data memory location "f" are rotated one bit to the left If "d" is "0", the result is placed in the W register. If "d" is "1", the result is stored back in data memory location "f".

RRCF (Rotate Right f through Carry): The contents of data memory location "f" are rotated one bit to the right through the Carry Flag. If "d" is "0", the result is placed in the W register. If "d" is "1", the result is placed into data memory location "f".

RRNCF (Rotate Right f (no carry)): The contents of data memory location "f" are rotated one bit to the right. If "d" is "0", the result is placed in the W register. If "d" is "1", the result is placed in data memory location "f".

SETF (Set f and Set d): If "d" is "0", both the data memory location "f" and W register are set to the highest location of the general purpose file registers implemented as static RAM. If "d" is "1", only the data memory location "f" is set to that location.

SLEEP: The power-down ($\overline{PD}$) status bit is cleared, the time-out ($\overline{TO}$) status bit is set, and the watchdog timer (WDT) and its prescaler are cleared. The processor is thereby put into SLEEP mode with the oscillator stopped.

SUBLW (Subtract W from literal): The contents of the W register are subtracted from the eight bit literal "k". The result is placed in the W register.

SUBWF (Subtract W from f): Subtract (2's complement method) the W register from data memory location "f". If "d" is "0", the result is stored in the W register. If "d" is "1", the result is stored back in data memory location "f".

SUBWFB (Subtract W from f with Borrow): Subtract (2's complement method) the W register and the carry flag (borrow) from data memory location "f". If "d" is "0", the result is stored in the W register. If "d" is "1", the result is stored in data memory location "f".

SWAPF (Swap f): The upper and lower nibbles of data memory location "f" are exchanged. If "d" is "0", the result is placed in W register. If "d" is "1", the result is placed in data memory location "f".

TABLRD (Table Read): This is a 2-cycle instruction, and, in some instances, can even be 3-cycle. First, either the low byte (if t=0, where t is the table byte select and t=0 means perform operation on lower byte) or the high byte (if t=1, meaning perform operation on the upper byte) of the table latch (TBLAT) is moved to register file "f". Then the contents of the program memory location pointed to by the 16 bit Table Pointer (TBLPTR) is loaded into the 16 bit TBLAT.

TABLWT (Table Write): This is a 2-cycle instruction, and can be many cycles in length if write is to on-chip EPROM program memory 17. First, contents of file register "f" are loaded in the low byte (if t=0) or high byte (if t=1) of TBLAT. If TABLPTR points to external program memory location, the contents of TBLAT are written to that location and the instruction takes 2 cycles. If TBLPTR points to an internal EPROM location, but the global write protection fuse (FGLWP) is set, then no write takes place and the instruction executes in 2 cycles. If TBLPTR points to an internal EPROM location and protection is not set, then an EPROM write (program) sequence is initiated, and is terminated when an interrupt is received. If the GLINTD bit is set, the interrupt will complete the TABLWT, but no interrupt sequence will be invoked. If GLINTD=0, then interrupt will be acknowledged following the TABLWT. If FGLWP is programmed, then all TABLWT instructions will be two cycles long regardless of operating modes or addresses.

TLRD (Table Latch Read): Read data from high byte (t=1) or low byte (t=0) of 16 bit TBLAT into file register "f". TBLAT is unaffected. This instruction is used in conjunction with TABLRD to transfer data from program memory to data memory.

TLWT (Table Latch Write): Data from file register "f" is written into the low byte (t=0) or the high byte (t=1) of the 16 bit TBLAT. This instruction is used in conjunction with TABLWT, to transfer data from data memory to program memory.

TSTFSZ (Test f, skip if 0): If the contents of data memory location "f" are 0 then the next instruction, fetched during the current instruction execution, is skipped (discarded) and a NOP is executed instead making this a 2-cycle instruction.

XORLW (Exclusive OR literal with W): The contents of the W register are XOR'ed with the eight bit literal "k". The result is placed in the W register.

XORWF (Exclusive OR W with f): Exclusive OR the contents of the W register with data memory location "f". If "d" is "0", the result is stored in the W register. If "d" is "1", the result is stored in data memory location "f".

Of the above instructions, the following are data move instructions: MOVFP, MOVLB, MOVPF, MOVWF, TABLRD, TABLWT, TLRD, and TLWT; the following are arithmetic and logicAL instructions: ADDLW, ADDWF, ADDWFC, ANDLW, ANDWF, CLRF, COMF, DAW, DECF, INCF, IORLW, IORWF, MOVLW, NEGW, RLCF, RLNCF, RRCF, RRNCF, SETF, SUBLW, SUBWF, SUBWFB, SWAPF, XORLW, and XORWF; the following are program control instructions: CALL, CPFSEQ, CPFSGT, CPFSLT, DECFSZ, DCFSNZ, GOTO, INCFSZ, INFSNZ, LCALL, RETFIE, RETLW, RETURN, and TSTFSZ; the following are bit handling instructions: BCF, BSF, BTFSC, BTFSS, and BTG; and the following are special control instructions: CLRWDT, NOP, and SLEEP.

The central processing unit portion of the microcontroller includes a number of significant hardware elements. Indirect addressing registers consist of two register locations which are not physically implemented, but only used to implement indirect addressing of data memory 34 space. Two file select registers are 8 bit wide indirect address pointers for data memory 34. Two more file registers form a 16 bit pointer (TBLPTR) to address the external 64K program memory space, and are used by instructions TABLWT and TABLRD to transfer data between program memory 17 space and data memory space. The table pointer serves as the 16 bit address of the data word within the program memory. The table latch (TBLAT) is a 16 bit latch, consisting of TBLATH and TBLATL, the high and low bytes of the latch. TBLAT is used as a temporary holding latch during data transfer between program and data memory; it is not mapped into either memory.

Also part of the microcontroller CPU hardware is the program counter (PC) module 30. The PC itself is a 16 bit register with a PCL (low byte) 51 mapped in the data memory and readable and writable as with any other register, and with a PCH (high byte) 52 which is not mapped in either data or program memory and, hence, not directly addressable. PCLATH (PC high latch) 54 is an 8 bit register mapped into data memory, which acts as a holding latch for the high byte of the PC and through which PCH can be read or written. The PC is incremented after each instruction fetch during phase Q1 unless modified by GOTO, CALL, LCALL, RETURN, RETLW, or RETFIE instructions, or by an interrupt response, or by a destination write to PCL by an instruction. "Skips" are equivalent to incrementing the PC twice.

The CPU hardware also includes stack 37 organized 16 word×16 bit, which is not part of either data or program memory space. The PC is pushed onto the stack if CALL or LCALL instructions are executed, or if an interrupt produces a branching to the corresponding interrupt vector. The stack is popped into the PC if a RETURN, RETLW, or RETFIE instruction is executed. TOS (top of the stack) is not addressable in any other way. A read only status bit is used to indicate stack overflow error.

Interrupt logic is provided in the form of interrupt sources mapped into interrupt vectors. When an interrupt occurs, the current PC value is pushed onto the stack and the vector corresponding to the interrupt source is loaded into the PC. Peripherals 57 all use the same interrupt vector, and when multiple peripheral sources are enabled, the priorities are determined by software. INT and RT external interrupts 58 and 59 may be positive or negative edge triggered, also selectable by software.

Arithmetic and logic unit (ALU) 62 of the microcontroller CPU performs arithmetic or logical operations on a single operand or two operands. All single operand instructions operate either on the W register 47 or a file register. Two operand instructions have the W register as one operand and the other as either a file register or an 8 bit immediate constant.

A principal distinction between microcontrollers in general and other processors is the availability in the former of special circuits to handle the needs of real time applications. One of such features of microcontroller 10 intended to maximize system reliability, eliminate costly external components, provide power saving operating modes and offer code protection, is the power-on detection scheme of the present invention. A dual timer arrangement is utilized to provide sufficient time for the power supply and the clock to stabilize before the microcontroller is allowed to leave the reset state, thereby assuring that (i) the power level is in the proper operating range and (ii) the clock is stable, for proper execution by the microcontroller.

Figure 8:
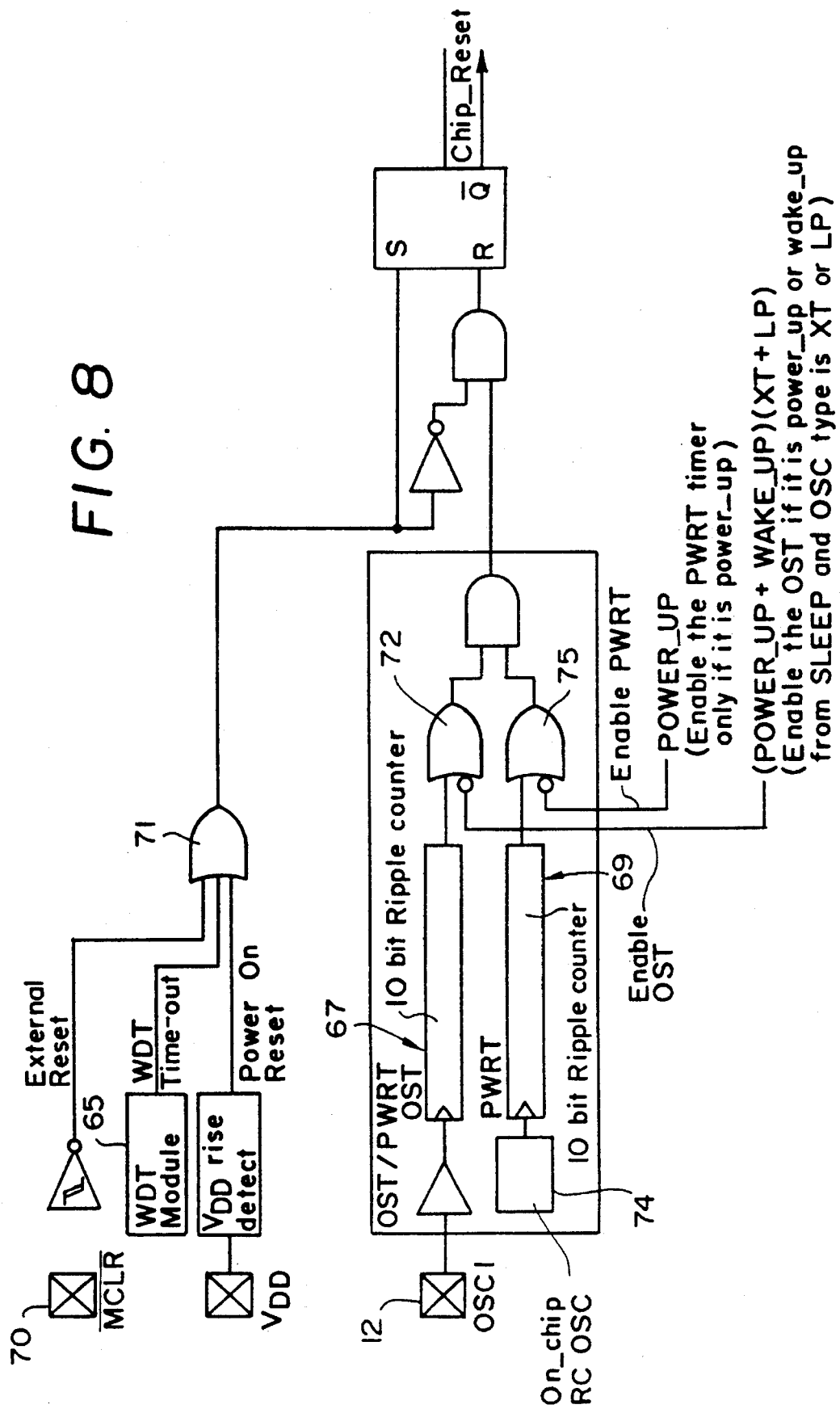
FIG. 8 is a simplified block diagram of the on-chip reset circuit for the microcontroller.

Referring to FIG. 8, an on-chip watchdog timer (WDT) 65 in module 15 (FIG. 1), is utilized to allow the microcontroller to recover from software malfunction. WDT 65 itself is an 8 bit asynchronous ripple counter with an 8 bit prescaler which is also an asynchronous ripple counter, and, for added reliability, runs off its own internal RC oscillator. The WDT is not readable or writable, and is not mapped in data or program memory space. A pair of EPROM fuses, FWDT1 and FWDT0, (configuration bits) are mapped at addressable locations in EPROM memory 17 to provide up to four operating options (modes) for the WDT, affecting its period (frequency) or (as a simple timer) its instruction cycle time. The EPROM fuses will be discussed further below. Preferably, the WDT can be shut off only through the EPROM fuses. The WDT and its prescaler are reset and the time-out bit ($\overline{TO}$) is set to 1 if a CLRWDT instruction is executed, or a SLEEP instruction is executed, or a power on reset occurs. Normally, the user program would be established to clear the WDT timer on a regular interval, but if it does not, the WDT will overflow and reset the microcontroller chip. If, however, the fuses are set to configure the WDT as a simple timer, the WDT increments on internal OSC/4 clock with a prescale of 256 (i.e., increments at OSC frequency/1024 rate), and, on overflow, the $\overline{TO}$ bit is cleared but the chip is not reset. In this mode, the WDT is stopped during SLEEP.

According to an aspect of the invention, two timing circuits provide the desired delays on power-up of the microcontroller. One of these is an oscillator start-up timer (OST) 67 (FIG. 8) which keeps the microcontroller in reset state until the crystal oscillator of the clock generator (in module 15, FIG. 1) for the microcontroller is stable. The other of these two timers is a power-up timer (PWRT) 69, which provides a fixed delay—80 milliseconds (ms) nominal, for example—on power up only, to maintain the microcontroller in the reset state until the power supply becomes stable. WDT 65 and its prescaler are physically the same as PWRT 69, differing only in the roles they perform and the outside reset condition. With the OST 67 and PWRT 69 timers on chip, external reset circuitry will normally not be required.

A reset of the entire microcontroller circuitry is accomplished in the following manner. The oscillator buffer is enabled so that the oscillator is restarted if waking up from SLEEP through reset. The SLEEP mode of the device, to be described in greater detail below, is a very low current power-down mode which significantly reduces power consumption of the device during periods of inactivity in its particular application. Wake up from SLEEP is accomplished by the external reset or through time-out of the watchdog timer or through an interrupt. Continuing with the sequence for reset, the PC is reset to its lowest address, and all registers are reset. The WDT and its prescaler are cleared. The internal clock generator is held in Q1 state, and, if external execution is selected, the ALE output is held low while the $\overline{OE}$ and $\overline{WR}$ outputs are driven high (at port E, FIG. 1). Finally, I/O ports B, C and D are configured as inputs.

Reset is caused by the occurrence of any of three events. A power on reset will take place upon detection of a VDD rise (e.g, in the 1.2 V to 2.0 V range). Another possible event is an external reset which occurs with a "low" level on the $\overline{MCLR}$ input (70, FIG. 1). The third event is a WDT reset, which occurs when the watchdog timer times out. These three events are depicted in the upper half of FIG. 8, and supply respective inputs to OR gate 71. Once the device is placed in the reset condition, that condition is maintained for as long as either (i) the $\overline{MCLR}$ input 70 is "low", or (ii) the $\overline{MCLR}$ input goes high but the PWRT 69 is active (i.e., has not timed out), or (iii) the OST 67 is active (i.e., has not timed out).

The first of the latter three conditions is an ongoing external reset, and the second and third are resets imposed if either the PWRT timer or the OST timer are active. Consequently, absent an ongoing external reset, the device will commence executing unless it is prevented from doing so by being held in reset because either of those two timers has not yet timed out. The timeout periods for the two timers are selected according to the invention to be sufficiently long to allow the power to the device to stabilize and the clock frequency to stabilize, but not to unduly delay execution of instructions or programs by the processor.

Figure 9:
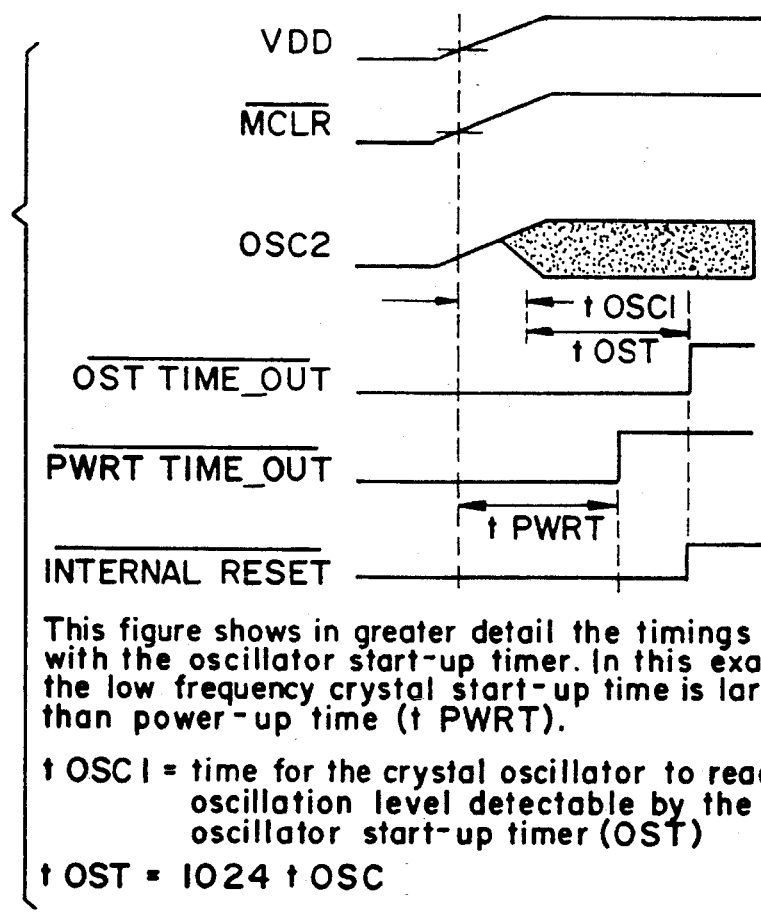
FIG. 9 is a timing diagram for a portion of the reset circuit of FIG. 8.

With continuing reference to FIG. 8 and also to the start up timing diagram of FIG. 9, OST timer 67 implements a 1024 oscillator period delay, provided by a 10 bit ripple counter, both on power-up and on wake up from SLEEP. On power-up, the delay begins from the rising edge of MCLR, whereas on wake up from SLEEP, the time-out is counted from the occurrence of the wake-up event. The OST timer starts counting oscillator signal on OSC1 pin 12 when the amplitude on that pin reaches a predetermined acceptable limit. This is enabled by means of an enable input on gate 72 on detection of the rising edge of $\overline{MCLR}$ or wake-up from SLEEP, provided that the oscillator is in either the XT or LF mode which utilizes a crystal oscillator or resonator. The time-out allows the crystal oscillator (or resonator) to stabilize before the microcontroller is taken out of reset. The circuit will function with crystals of any frequency. Note that this time-out is not invoked in the EC or RC oscillator modes, because no crystal or other oscillation mechanism requiring stabilization after start-up is used.

The PWRT timer 69 implements a fixed delay only on power-up. The delay is provided by a 10 bit ripple counter with input clock from an on-chip RC oscillator 74. This time-out is counted from the rising edge of $\overline{MCLR}$, to allow the $V_{DD}$ supply to reach acceptable level before the device is taken out of reset, as shown in FIG. 9. An internal Power On Reset pulse (POR, in the upper half of FIG. 8) is generated when a $V_{DD}$ rise is detected during initial power-up of the chip (e.g., nominally 1.2 V to 2.0 V). The POR signal resets internal registers, and also enables PWRT 69 to commence its delay by an input to gate 75. Such operation of the PWRT timer occurs only on device power-up because a wake-up from SLEEP will normally take place without affecting the $V_{DD}$ supply level.

The PWRT and OST timers assure proper power on reset without external (i.e., off-chip) components, by merely tying the $\overline{MCLR}$ pin 70 to $V_{DD}$. As $V_{DD}$ comes up, POR is generated and $\overline{MCLR}$ is sensed as 1 inside the chip, and both OST and PWRT begin time-out. If the rise time of $V_{DD}$ is so slow that at the end of the PWRT time-out, $V_{DD}$ has not reached an acceptable level, then external RC delay must be added on the $\overline{MCLR}$ pin.

The dual timer scheme assures that the power to the device is in the proper operating range, and that the clock is stable, before the device is allowed to execute a program.

The device 10 may be put in the power saving SLEEP (or power down) mode whenever a static condition is appropriate, in which all on-chip clocks are stopped. This mode is entered upon execution of a SLEEP instruction, which shuts down the oscillator, sets the $\overline{TO}$ bit, and clears the $\overline{PD}$ bit, the WDT timer and its prescaler. In the XT or LF mode of the oscillator, both OSC1 and OSC2 pins are placed in the high impedance state. In the EC or RC mode, the OSC1 pin is placed in high impedance state while the OSC2 pin is driven low. Accordingly, no clocks are presented to the internal logic even when an external clock is present on the OSC1 pin. The chip then remains in a completely static condition, with certain exceptions as follows:

(1) If the WDT is enabled, it will keep running and therefore wake up the chip on time-out.

(2) Signal edges on the RT pin (port A, FIG. 1) will increment the RTCC (real time clock/counter) module 77 prescaler (an asynchronous ripple counter) if an external clock source is selected for the RTCC. The RTCC will not increment without the external clock.

(3) Any external interrupt event will wake up the device if the corresponding interrupt mask bit was enabled when entering the SLEEP mode. If the GLINTD (global interrupt disable) bit is "0" (off), the device will jump to the corresponding interrupt vector on wake-up, but otherwise the device will wake up and resume executing instructions or program without responding to the interrupt (i.e., will not branch to the interrupt vector).

(4) Any peripheral element operating independently of the internal clock can change its status because of external events. For example, the serial port receive shift register will shift in data in synchronous slave (external clock) mode.

In addition to the on-chip oscillator, any circuitry which consumes current is turned off in the SLEEP mode, including the entire EPROM program memory and the EPROM fuses. The only fuses remaining active are the WDT fuses (FWDT0 and FWDT1). The device can only be awakened from the SLEEP mode by one of the following events:

(1) Inducing a power on reset by bringing $V_{DD}$ down to zero and back up to operational level.

(2) Applying a "low" level on the $\overline{\text{MCLR}}$ pin.

(3) A WDT time-out with WDT enabled.

(4) Various interrupts.

According to another aspect of the invention, the code or program contained in the program memory EPROM can be protected (made secure) from piracy or unauthorized alteration when the device is in the code protected microcontroller mode, by blowing selected configuration fuses. In particular, this secure microcontroller mode is attained by blowing a pair of configuration fuses designated FPMM1 and FPMM0 from the "1" state to the "0" state. These and other configuration fuses of the microcontroller are EPROM bits which when programmed read "0", constituting the condition of being "blown", or open, and when left unprogrammed read "1", constituting the condition of being "erased" or closed.

In the microcontroller of the present invention, the configuration fuses enable the user to select between options such as operating modes by merely selecting the proper condition. These fuses are mapped into the on-chip program memory 17 (FIG. 1) to simplify programming, which also allows the value (condition) of each fuse to be read. However, the fuse locations are accessible to be read or written to only in the microcontroller and protected microcontroller modes. In the microprocessor and extended microcontroller modes, this section of the program memory is mapped externally (as shown in FIG. 5) thereby making the fuse locations inaccessible. Each fuse is assigned one program memory address location. To "blow" (program) a fuse, the address of that fuse is written to, using a TABLWT instruction. For configuration fuses used in the microcontroller of the invention, the fuses (EPROM bits) are arranged to be blown without regard to the data written into the fuse address location. That is, the data is immaterial—the mere act of writing to an unprogrammed EPROM fuse is, by itself, sufficient to blow the fuse.

After the appropriate pair of EPROM fuses are blown to select the secure microcontroller mode, a TBLRD (read) instruction executed from off-chip EPROM (or anywhere outside the secure area of the protected program EPROM) which attempts to read the on-chip program EPROM will read only encrypted (scrambled) data. However, if the instruction is executed from an address less than 2K (that is, from the on-chip program EPROM) the data read will appear un-encrypted.

To further prevent unauthorized access to the secure area, any TABLWT (write) instruction executed from off-chip EPROM or other location outside the secure area, which attempts to write the embedded program EPROM is prevented from programming the destination. It remains necessary to terminate the instruction by an interrupt condition, and the table latches are still written. As in the analogous readout instruction case, however, a TABLWT instruction executed from an address less than 2K is effective to program the addressed on-chip program EPROM location despite the code protected state of that memory, because of the nature of the secure microcontroller mode in that such instruction has been executed from an authorized location.

These measures are effective to prevent read, verify or programming of any on-chip program memory EPROM location from outside the secure area intended to be protected.

The microcontroller of the invention has a total of eight configuration fuses, including the FPMM0 and FPMM1 fuses described above for selecting overall operating mode. By way of example, the secure microcontroller mode is selected by programming both of the latter (i.e., both "blown" to the "0" state); the normal microcontroller mode is selected by programming FPMM0 and leaving FPMM1 unprogrammed; an extended microcontroller mode is selected by the reverse of the latter; and a microprocessor mode is selected by leaving both of those fuses unprogrammed. The other six EPROM configuration fuses include a pair of fuses designated FOSC0 and FOSC1 which may be programmed or unprogrammed in any of four different combinations for selection of the corresponding desired one of the four different oscillator modes EC, RC, XT and LF, discussed earlier herein; a pair of fuses designated FWDT0 and FWDT1 which similarly may be programmed or unprogrammed in any of four different combinations for selection of the corresponding desired one of four different watchdog timer (WDT) operating options or modes, also discussed above; a global write protection fuse FGLWP which may be programmed to prevent programming altogether (i.e., blowing this fuse would prevent writes to the on-chip program EPROM, the off-chip EPROM, and all configuration fuses); and, lastly, a write protection fuse FOPTWP to prevent alteration of any of the configuration fuses. The TABLWT instruction is implemented to always execute a "short write" (e.g., two cycles only) if global write protection is enabled.

An array of high speed peripherals is incorporated on the chip 10 for purposes of real time computation intensive applications. To offload the CPU tasks as much as possible, the peripherals 57 (FIG. 1) are highly intelligent and possess their own interrupts and error handling. Module 80 includes three 16 bit timer/counters (TMR1, TMR2 and TMR3), one of which can be split into two 8 bit timers; two high speed captures for efficient interface to shaft encoders and other high speed pulse train sources; and two high speed pulse width modulation (PWM) outputs with up to 10 bit resolution to allow motor control directly or through DC control voltages. In addition, up to four external and several internal interrupt sources are among the peripherals, as well as numerous I/O pins most of which can be configured as inputs or outputs in software.

All peripheral registers are mapped into data memory 34 space, using a banking scheme in which a segment of data memory with a limited number of selected addresses is banked. This allows accommodation of a large number of registers without wasting general purpose data RAM capacity. A bank select register (BSR) 82 selects the currently active "peripheral bank". Although peripheral registers of related functionality may be grouped in one bank, it will typically be necessary to switch from bank to bank to address all peripherals related to a single task, and this is the purpose of the MOVLB instruction (move literal value to BSR).

The device 10 has five digital I/O ports designated A, B, C, D and E (FIG. 1), which together add up to 33 port pins most of which have an associated data direction register (DDR) bit to configure the associated port pin as input (DDR bit=1) or as output (DDR bit=0). Most of the port pins are multiplexed with the system bus or peripheral functions. Ports C, D and E, for example, multiplex with the former (AD<15:0>, ALE, $\overline{WR}$ and $\overline{OE}$). All five of these ports and their associated DDR registers are mapped into data memory 34. Control bits in the corresponding peripheral registers configure the pins as either port pins or as peripheral inputs/outputs, and when a port pin is selected for an alternate function its direction is determined by the peripheral logic which forces the DDR bit to the desired state.

Port A is a 6 bit port in one of the banked addresses, has no data direction register associated with it, and is multiplexed with peripheral functions, including external interrupt inputs on pins RA0/INT and RA1/RT. Port B is an 8 bit wide bidirectional port also mapped in one of the banks in data memory 34. Writing to its mapped address writes to the prot latch and reading the address reads the port pins. Most of its pins are multiplexed with peripheral functions, such as capture, PWM, and external clock. Port B is implemented to provide an "interrupt on change", in that an interrupt is generated when the port input changes (using its output data latch as a compare latch to cause generation of a high output on mismatch between the pin and the latch), and the interrupt can awaken the chip 10 from the SLEEP mode.

Ports C, D and E are mapped in another bank of the data memory. Ports C and D are 8 bit wide bidirectional ports, while port E is a 3 bit wide bidirectional port.

Serial port 83 is adapted to operate in either a full duplex asynchronous mode or a half duplex clocked synchronous mode, to provide a universal synchronous asynchronous receiver transmitter (USART). In the asynchronous mode, the clock is derived internally, while in the synchronous mode the clock may be either internal or external. A dedicated 8 bit baud rate generator (BRG) is preferably used for internal clock generation in this application. The BRG is mapped in banked space in the data memory 34 with a register which is readable and writable.

RTCC module 77 is one of several timer/counters in the microcontroller, including TMR1, TMR2 and TMR3 of module 80. The RTCC preferably includes a 16 bit timer/counter, high and low bytes, an 8 bit prescaler, and a source of external clock signal on the RT pin. 8 bit timer/counters TMR1 and TMR2 are used as time bases for the PWM outputs of module 80, and 16 bit timer T3 is used for a capture function.

According to an aspect of the invention, simplified auto-programming is provided by using a scheme in which an instruction is used to program the program memory of the microcontroller which is equipped with an auto-incrementing pointer and an on-chip ROM to store program. The microcontroller is programmed using the TABLWT instruction with the table pointer pointing to an internal EPROM location of program memory 17. Consequently, a user may program an EPROM location while executing code, even from internal EPROM. Two "program and verify" routines are provided in address locations of the program memory. One of the two programs is a "universal program/verify" routine, which is the more flexible of the two, allowing the user to load any address, program a location, verify a location or increment to the next location, with variable programming pulse width. The other program is an "auto program/verify" routine, a simple but rigid programming method in which the microcontroller reads 2K locations sequentially from two external 2K×8 EPROMs and programs its own internal memory. They are mapped in the on-chip program memory space, but, to render them unerasable, the two programs reside in ROM rather than EPROM.

To execute either of these two programming routines, the TEST pin 85 (FIG. 1) is held high after power-up while MCLR pin 70 is held low, and then the $\overline{MCLR}$ pin is raised from 0 to 1 (VCC or VPP). Program execution begins in the PC (program counter) 30, following reset, and the program immediately polls port B to determine a branch address. The program can execute a "universal program/verify" routine or an "auto program/verify" routine. When TEST pin 85 is high, the power-on reset and oscillator start-up timers (PWRT and OST, FIG. 8) are disabled. The universal program/verify mode is used for full-feature programmers, but is not of particular interest relative to the present invention or its implementation, and hence, will not be further described.

Figure 10:
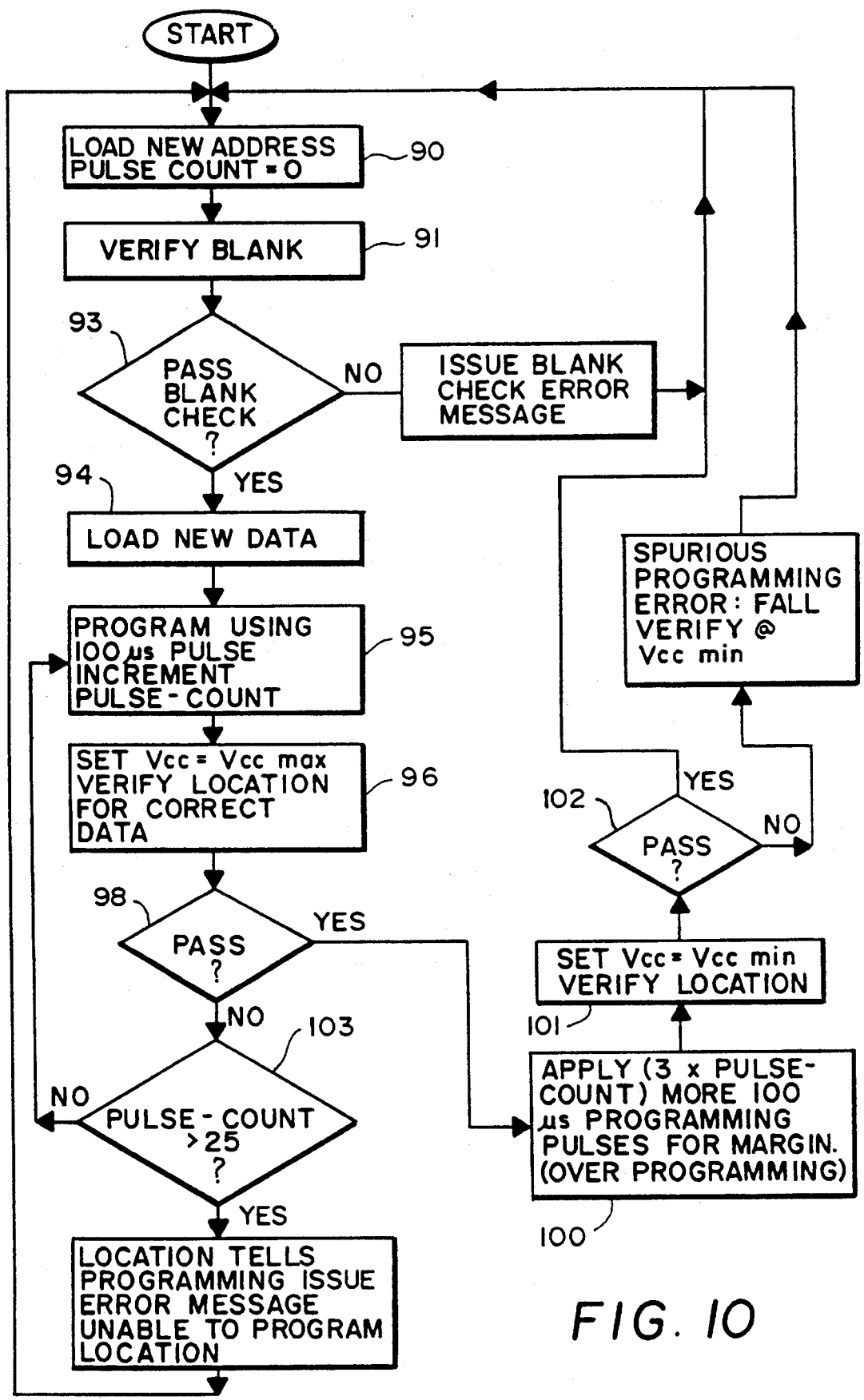
FIG. 10 is a preferred programming algorithm for use in auto-programming of the microcontroller.

Microcontroller 10 uses an intelligent quick pulse algorithm which calls for program verification at VCC(min) as well as VCC(max). Verification at VCC(min) guarantees good "erase margin", and verification at VCC(max) guarantees good "program margin". Referring to FIG. 10, the programming algorithm starts by loading a new address from memory with pulse count at 0 (block 90), the address is verified as blank (block 91), and the blank check (verification) is either passed or failed (decision block 93). If passed, new data is loaded (94), and then programmed using 100 us pulse with increment of pulse-count (95). VCC is then set at VCC(max) and the location for correct data is verified (96). If this verification is passed (98), a 3× (three times) pulse count is applied to increase the program margin (100), and VCC is set at VCC(min) to verify location (101). If the verification at VCC(min) is passed (102), the algorithm returns to start and a new address is loaded (90).

A failure at any of the above pass/fail decision steps (93, 102) of the programming algorithm will result in an appropriate error message or flag and a return to start, except in the case of a failure of verification at VCC(max) (98) and a further finding that the pulse count is not greater than 25 (103). In that case, the program returns to the increment pulse count step (95) and VCC is set at VCC(max) again to verify location for correct data (96), followed by the pass/fail decision for that verification (98).

Figure 12:
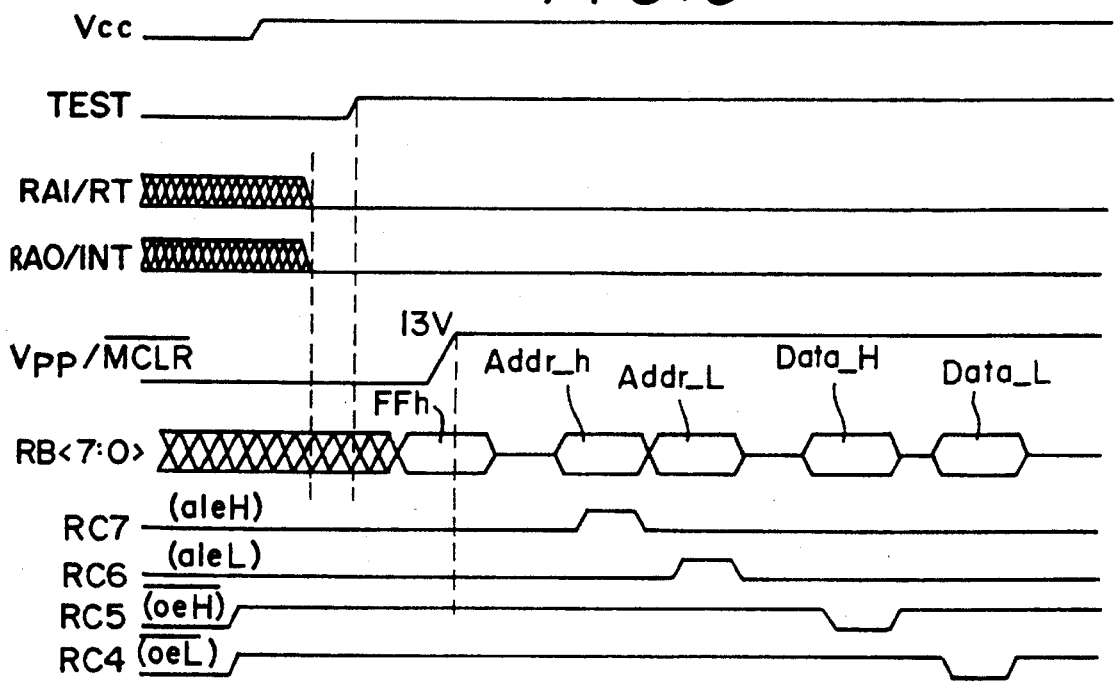
FIG. 12 is a timing diagram for the auto-programmer.
Figure 11:
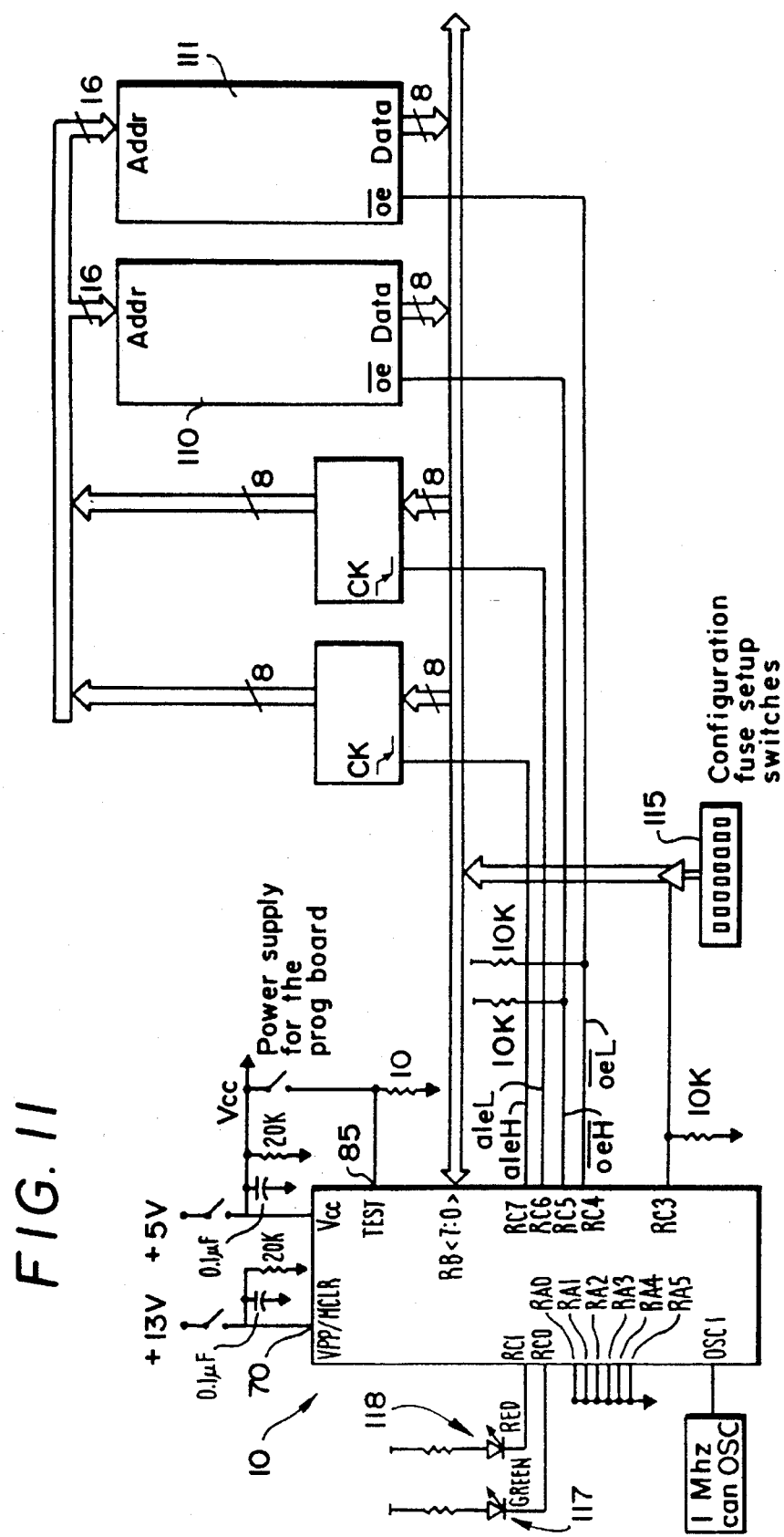
FIG. 11 is a simplified block diagram of the auto-programmer.

In the auto-programming mode, the microcontroller reads from two external 2K×8 EPROMs and programs itself by means of an instruction and an auto-incrementing pointer used by the instruction to program the program memory by incrementing to step through the successive address locations thereof for storage of the consecutive steps of the program. The microcontroller includes an on-chip hard coded (i.e., mask- or factory-programmed) memory, such as ROM, containing the instruction for auto-programming as well as other code desired to be stored therein. FIG. 11 is a simplified circuit diagram for the auto-programmer, and FIG. 12 is a timing diagram illustrating the sequence in which VCC, VPP, TEST and other signals are applied (or occur). The microcontroller 10 to be programmed is plugged into (operatively interfaced with) the auto-programmer, which is the overall circuit of FIG. 11. The two 2K×8 external EPROMs 110, 111 programmed with the desired code are inserted into respective sockets of (i.e., operatively interfaced with) the auto-programmer, as well. VCC power-on is enabled and allowed to stabilize, as shown in the VCC portion of the timing diagram (FIG. 12). When VCC is stable, the auto-programming mode is entered by first raising the TEST pin to 1 (high, TEST portion of timing diagram). Then the VCC/MCLR pin is raised to VPP (for example, 12.5 to 13.5 V, nominally 13.0 V, VPP/MCLR portion of timing diagram), which brings the microcontroller out of reset to commence executing the auto-programming routine.

In the auto-programming routine, the microcontroller reads the two EPROMs, one word at a time, and programs the corresponding location in its on-chip 2K×16 EPROM program memory 17 using an auto-incrementing pointer at an address location on port B (RB<7:0>), and pins RC4–RC7 of port C (see respective portions of timing diagram FIG. 12). When the entire on-chip EPROM has been successfully programmed, the microcontroller 10 reads the switch settings 115 (FIG. 11) for the configuration fuse information, and programs its fuses according to that configuration. A visual indication is provided so that the operator will be made aware of absence of error or an error in the programming, using a pair of light-emitting diodes (LEDs) 117 and 118 to pins RC0 and RC1 of port C. Green LED 117 and red LED 118 are both on (lit) during the programming. At the end of the programming only one LED remains on, the green if the programming encountered no error and the red if an error has occurred.

The foregoing scheme allows the microcontroller (or microprocessor) to program its own program memory in simple fashion, with a pointer to the program memory directed by an instruction.

All test modes of the microcontroller are accessed via the TEST pin 85, port A and port B. The test pin is a schmitt trigger input which has neither pull-up nor pull-down, and must be kept low in applications. VPP must be kept at a nominal 12 V while the TABLWT is executed if programming is desired. Port A is used for special EPROM test modes and port B is used for a CPU test.

A microcontroller having a small pin count may be insufficient to inject 16 bit instructions at full speed. The microcontroller of the invention has a block of on-chip program memory 17 designated as the test EPROM which is reserved for testing at the factory. The test EPROM is programmed with the desired test code prior to testing. The test EPROM is programmed with a series of small sub-routines, one for each instruction in the microcontroller instruction set, and a controlling test routine which reads port B and places it in PC low. The CPU is adapted at that point to jump to the address of the instruction sub-routine being tested. A PC high keeps the PC pointing in the test EPROM, and when the test for the particular instruction sub-routine is complete, the control program (routine) again reads port B for the next value of PC low, so that ultimately all of the instructions in the device are tested.

A test mode register (TSTMD1) illustrated in FIG. 13 provides a means to test various configurations of the chip 10 without blowing the EPROM fuses. This is another important aspect of the invention, in which the EPROM fuses are emulated by test latches as indicated in the table of FIG. 14. The meaning of the bits in the TSTMD1 register is identical to the code protection and configuration fuses described earlier herein, except that the sense is reversed, i.e., a fuse=0 corresponds to a bit in this instance being a 1. The TSTMD1 register is adapted and arranged to be accessed for read/write only in test mode or interrogation mode. Also, the configuration bits in TSTMD1 control the configuration only when the TSTMUX bit (FIG. 14) is 0. If TSTMUX=1, then the state of the microcontroller is defined by the fuses for these bits. The code protection bits are made independent of the TSTMUX bit. If the fuses for these bits are erased, the test latch can override the fuses regardless of the state of the TSTMUX bit. If the fuses are blown they cannot be overridden.

The test mode register is readable in all modes, and, in normal mode, reflects the value of the fuses. TSTMD1 is held in reset condition when not in emulation or test modes, which defines external program and WDT fuses blown and all other fuses erased.

Although certain aspects of the invention have been described in connection with a preferred embodiment of a microcontroller, it will be apparent from the foregoing description to persons skilled in the art that variations and modifications of the preferred embodiment may be implemented without deprating from the spirit and scope of the invention. It is therefore desired that the present invention shall be limited only to the extent required by the appended claims and the rules and principles of applicable law.

What is claimed is:

1. A microcontroller fabricated on a semiconductor chip, and configurable to any of a plurality of operating modes to execute programs and instructions and, in response to the execution of the programs and instructions, to generate control signals to selectively control external apparatus, said microcontroller comprising:

an on-chip EPROM program memory,

EPROM fuses occupying a predetermined number of address locations of said on-chip EPROM program memory for storing a binary value of a bit, each of said EPROM fuses having at any given time either one of two different states defined as blown or not blown according to the value of the bit stored in a respective address location of said on-chip EPROM program memory, configuration means including predetermined ones of said EPROM fuses for configuring the microcontroller in desired ones of said plurality of operating modes according to which of the two different states is occupied by respective said predetermined ones of said EPROM fuses, and test means for testing the microcontroller in said operating modes, said test means including means for emulating said predetermined ones of said EPROM fuses to configure the microcontroller in operating modes for test purposes without using said predetermined ones of said EPROM fuses.

2. The microcontroller of claim 1, wherein:

the test means includes means for suppressing a change of state of said predetermined ones of said EPROM fuses during testing of the microcontroller in said operating modes.

3. The microcontroller of claim 1, wherein:

the emulating means includes a plurality of programmable latches.

4. The microcontroller of claim 1, further including:

means responsive to completion of testing of the microcontroller for inhibiting the means for emulating of the test means from continuing to emulate said predetermined ones of said EPROM fuses.

5. A method of testing a microcontroller fabricated on a semiconductor chip, and having an on-chip EPROM program memory, wherein the microcontroller is configurable to any one of a plurality of operating modes according to which of two different fuse states are occupied by respective selected ones of a plurality of programmable EPROM configuration fuses mapped in the on-chip EPROM program memory at predetermined address locations of said on-chip EPROM program memory, each of the predetermined address locations for storing either of two different values of a bit, wherein the fuse state of each of said EPROM configuration fuses is defined as blown or not blown according to the value of the bit stored in a respective address location of said on-chip EPROM program memory, said method comprising the steps of:

configuring the microcontroller in any desired one of said operating modes for testing the microcontroller in a desired one of said operating modes, the step of configuring the microcontroller being performed using latches emulating preselected ones of said EPROM fuses, and confining the testing of the microcontroller to a microcontroller operating mode in which the microcontroller is configured with said latches rather than with any of said EPROM fuses.

6. The method of claim 5, further including the step of:

suppressing programming of fuse state of said EPROM configuration fuses during the step of testing.

7. The method of claim 5, further including the step of:

removing the configuring of the microcontroller in a desired operating mode with said latches after completion of the testing step, and thereafter reconfiguring the microcontroller to a tested one of said operating modes previously configured using latches, by substituting preselected ones of said EPROM configuration fuses with programmed fuse states for said latches.

8. In a microcontroller fabricated on a semiconductor chip, and configurable to any of a plurality of operating modes to selectively control external apparatus, an improvement comprising:

an electrically programmable memory including programmable fuse means at predetermined address locations of the programmable memory for configuring the microcontroller in any of said plurality of operating modes depending on programming of the programmable fuse means, and test means for testing the microcontroller in said plurality of operating modes, the test means including latches and means for substituting the latches for the programmable fuse means to confine testing of the microcontroller in any of said plurality of operating modes to operating modes configured with the latches rather than with the programmable fuse means.

9. In the microcontroller improvement of claim 8, the test means further including means responsive to completion of testing of the microcontroller in an operating mode configured with the latches, for reconfiguring the microcontroller to the tested operating mode with the programmable fuse means for maintaining said tested operating mode for controlling the external apparatus.

10. A semiconductor device capable of being configured in a multiplicity of configurations corresponding to desired potential operating modes for a selected application of the semiconductor device, said semiconductor device comprising:

programmable fuse means for configuring said semiconductor device in any one of said multiplicity of configurations by suitably programming the programmable fuse means, to provide a permanently programmed desired operating mode for the semiconductor device, latch means for replacing the programmable fuse means to permit testing of the semiconductor device in all of said multiplicity of configurations for the selected application, and means for substituting the latch means for the programmable fuse means for configuring the semiconductor device in any one of said multiplicity of configurations by using the latch means rather than the programmable fuse means.

* * * * *